United States Patent [19]

Yakich

[11] Patent Number: 4,501,181
[45] Date of Patent: Feb. 26, 1985

[54] METHOD FOR DELIVERING COOLANT TO A BAND SAW, AND STRUCTURE THEREFOR

[75] Inventor: John L. Yakich, Broadview, Ill.

[73] Assignee: Armstrong-Blum Manufacturing Co., Chicago, Ill.

[21] Appl. No.: 360,011

[22] Filed: Mar. 19, 1982

[51] Int. Cl.³ .................. B23D 59/04; B26D 7/08
[52] U.S. Cl. .................................. 83/169; 83/171
[58] Field of Search ............ 83/16, 169, 170, 171, 83/24; 407/11; 29/DIG. 66; 408/56; 409/136; 51/267, 135 R; 125/21; 184/15 A, 15 R, 15 B, 56 R, 57

[56] References Cited

U.S. PATENT DOCUMENTS

| | | | |
|---|---|---|---|
| 1,421,107 | 6/1922 | Stowell | 83/169 |
| 2,327,483 | 8/1943 | Aitchison | 29/DIG. 66 |
| 2,815,562 | 12/1957 | Wilkie | 83/169 |
| 3,097,675 | 6/1963 | Benedict | 83/169 |
| 3,104,576 | 9/1963 | Robinson | 83/169 |
| 3,848,493 | 11/1974 | Harris | 83/169 |
| 4,209,950 | 7/1980 | Sielemann | 51/267 |
| 4,222,295 | 9/1980 | Sawamura | 83/169 |

Primary Examiner—James M. Meister
Assistant Examiner—John L. Knoble
Attorney, Agent, or Firm—James G. Staples

[57] ABSTRACT

This invention relates generally to a method and apparatus for increasing productivity of metal cutting band saws. More specifically, it relates to a method of holding coolant to a band saw blade over a long cutting span so that coolant is delivered to virtually all locations along the cut, and apparatus therefor.

5 Claims, 6 Drawing Figures

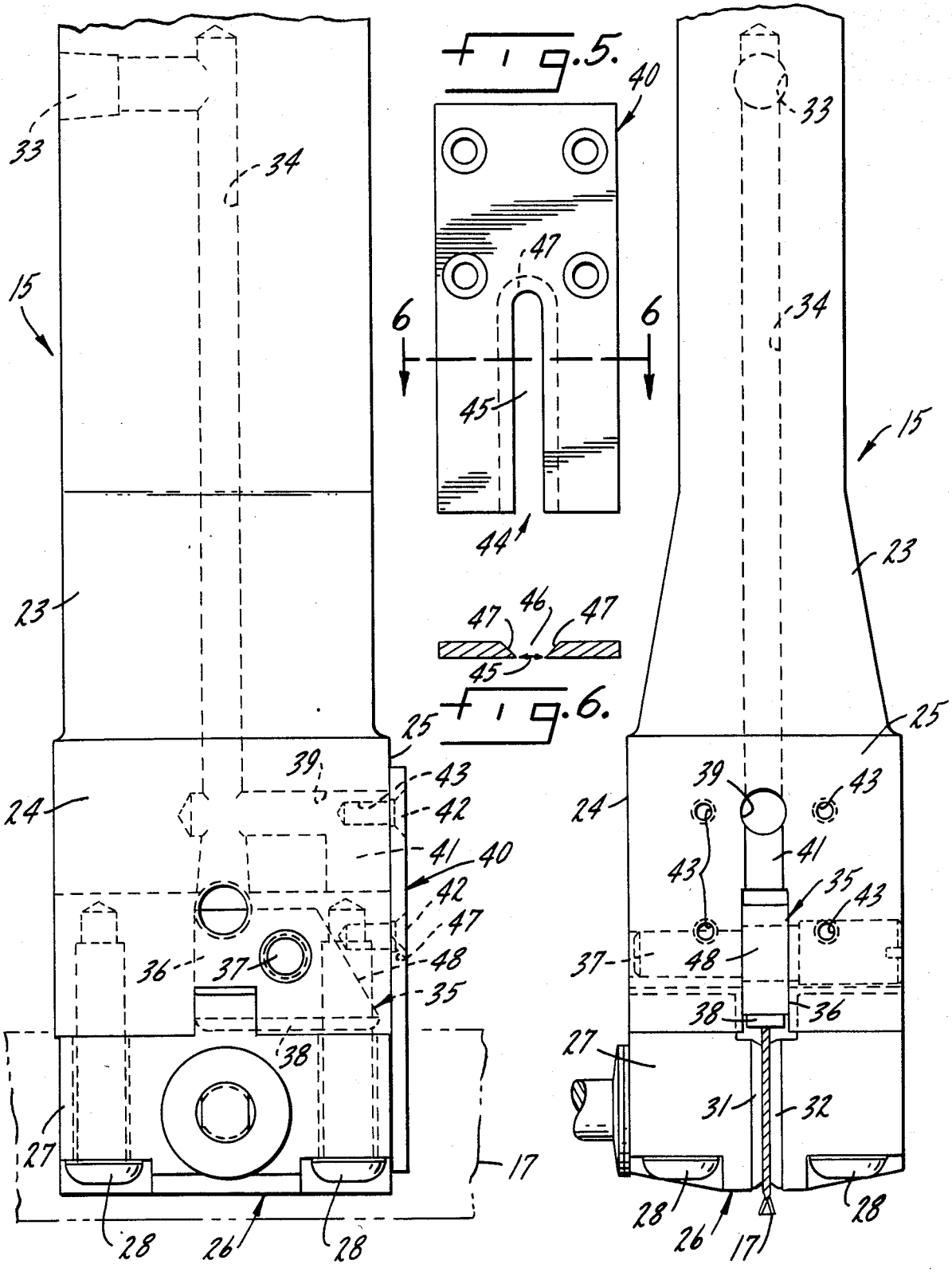

METHOD FOR DELIVERING COOLANT TO A BAND SAW, AND STRUCTURE THEREFOR

BACKGROUND OF THE INVENTION

It is well known in the art of cutting metals by band saws that cutting efficiency, (or productivity; the terms are often used interchangeably) is a function of the several factors of saw cutting speed, accuracy of cut, and blade life. It is further well-known that these factors are related, and that one factor in a given environment can nearly invariably be improved, but always at the sacrifice of one or both of the other factors. Accuracy, which may be considered to be the ability to make a straight cut, may be increased at the sacrifice of cutting speed, for example, since, other factors remaining constant, accuracy can be improved by using a slower, more controlled cutting speed.

One of the most important elements which goes into efficient operation is the use of coolant. Indeed, coolant is such a sensitive factor that it may be said that use of proper coolant techniques can upgrade a relatively poorly performing machine to an excellently performing machine. Here again, however, good coolant practice, to this point in time, has been difficult to obtain——and maintain—in normal operations.

A cardinal principle of good coolant practice is to hold the coolant to the blade as long as possible; that is, it is desirable that coolant be available for application to the work piece at the downstream side of a long cut, as well as at the beginning of the cut. The advantages of holding coolant to the blade over substantially the entire cut, and the resultant increased production (which may be expressed in terms of an increased number of pieces per hour or other unit of time, more square inches cut per unit of time, or more square inches cut per blade) are well appreciated in the art. Specifically:

Holding coolant to the blade longer yields longer blade life. This end result reflects the decreased likelihood of welding chips to the blade, with resultant tooth breakage, which an adequate supply of coolant at all locations provides.

Holding coolant to the blade longer also permits the use of increased cutting forces (notably, heavier feeds) because the blade runs cooler than it otherwise would. Alternatively, or even in addition to, faster cutting speeds are made possible.

And finally, holding coolant to the blade longer provides additional lubricity over the entire cut, which in turn results in a more efficient power usage for a given feed, blade speed, and blade.

For all these reasons it is highly important to maximize coolant practices, and particularly the "hold" of the coolant to the blade throughout the full length of the cut.

PRIOR ART

Metal cutting band saws include a table on which rests the work piece, vise means for holding the work piece fixed in position during cutting, and a pair of guide arms which guide the blade and convert it, to the extent possible, into a structural beam which just spans the width of the work piece, and a little more, as the saw frame in which the blade is mounted proceeds into the work. For further illustration of such system, in this case a horizontal system, see U.S. Pat. No. 3,465,628 and the publication entitled "MARVEL" High Speed Heavy Duty Metal Cutting Band Saws Series 15/6 and 15A6: Series 15/6M10 and 15/6/M10, No. 1502, which is published by Armstrong-Blum Manufacturing Co., 5800 West Bloomingdale Avenue, Chicago, Ill., 60639. It is believed that the aforesaid references represent the most material prior art.

SUMMARY OF THE INVENTION

The invention solves the problem of holding coolant to the blade in a metal cutting band saw over the entire length of cut by causing a portion of the coolant which is applied to the cutting operation to be directed in a direction which is parallel to the direction of movement of the blade. The resultant unusual feed orientation of the coolant to the blade, plus the surface tension, frictional "pull" of the moving blade on the coolant, will cause the coolant to hold to the blade for the great portion or all of the length of the cut, even when the length of the cut substantially equals the span formed by the conventional guide arms which flank the word piece.

As a result of this achievement, productivity will be increased in terms of one or more of the following: longer blade life, faster cuts, or more efficient power usage.

DESCRIPTION OF THE FIGURES

The invention is illustrated more or less diagrammatically in the accompanying Figures wherein:

FIG. 3 is an elevation of the lower end of the left guide arm of FIGS. 1 and 2, with certain parts removed for clarity, which illustrates the structural arrangement of the unit;

FIG. 4 is a right end view of FIG. 3 with the orifice plate omitted;

FIG. 5 is a right end view of the orifice plate of FIG. 3; and

FIG. 6 is a section taken substantially along the line 6—6 of FIG. 5.

Like reference numerals will be used to refer to like parts from Figure to Figure in the following description of the drawing.

DESCRIPTION OF SPECIFIC EMBODIMENT

Figure 1:
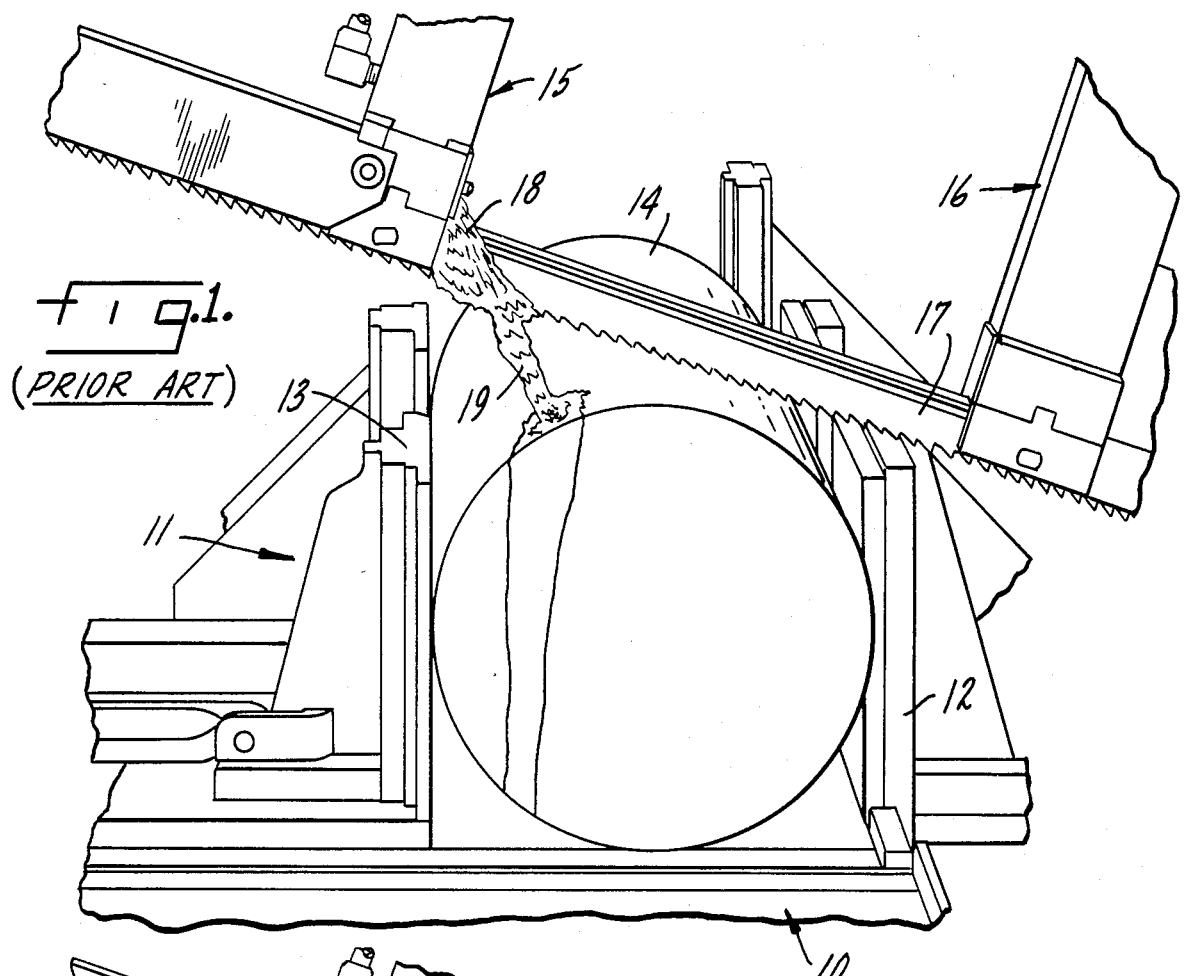
FIG. 1 is a perspective view of a coolant system of the prior art.
Figure 2:
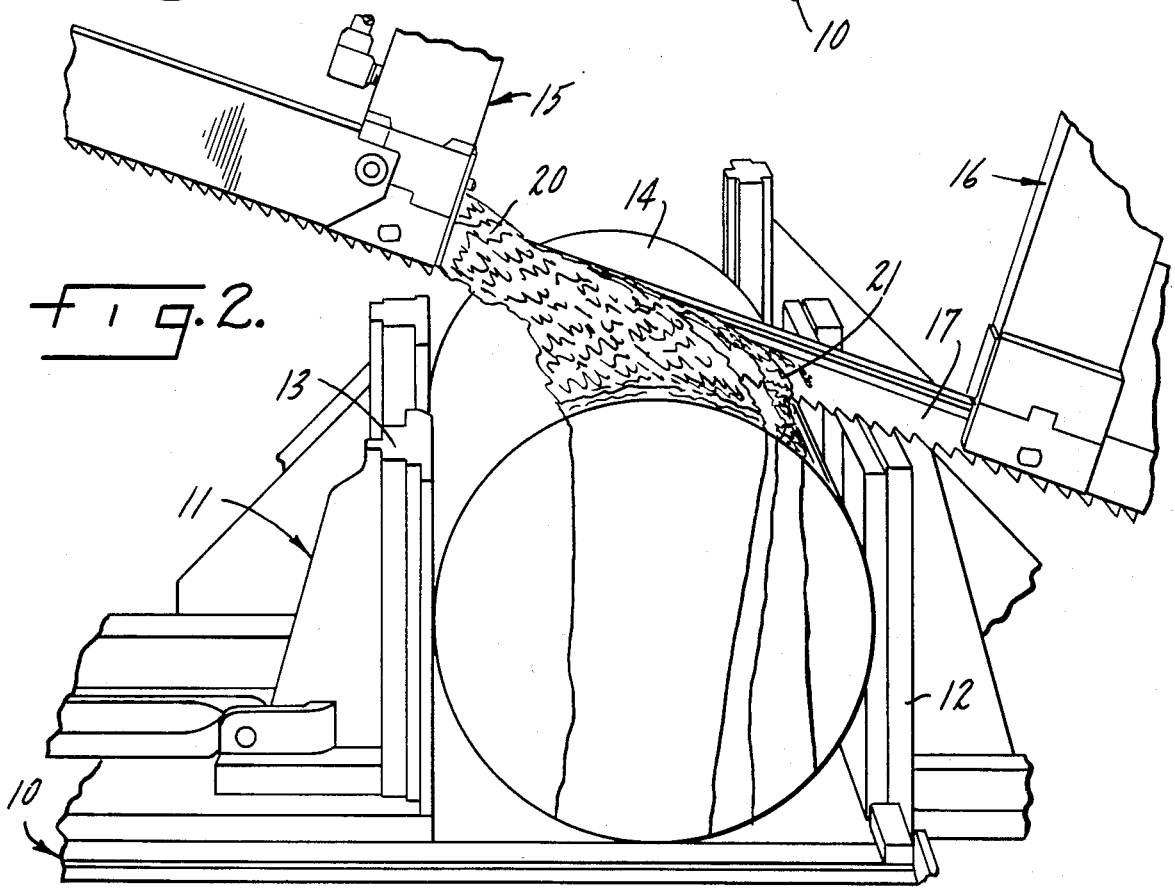
FIG. 2 is a perspective view of the functioning of the coolant in a band saw operating under the same conditions as the band saw of FIG. 1, but using the coolant holding method and apparatus of this invention.

Referring to FIGS. 1 and 2, the table of a metal cutting band saw of the type illustrated in the aforesaid publication is indicated generally at 10. The machine vise is indicated generally at 11, the vise having a fixed jaw 12 and a moveable jaw 13 actuated by any conventional means. The work piece is indicated at 14 in a clamped position in the machine vise. In this instance a piece of round bar stock has been shown. It will be understood however that the work piece may be of any shape, regular or irregular, such as tubing, structural members, bar stock, etc.

A pair of guide arms are indicated generally at 15 and 16 respectively. From reference to the aforesaid publication it will be noted that the guide arms are part of a saw frame which includes two large wheels around which a metal cutting band saw blade 17 passes during operation. In this instance, the right guide arm 16 may be assumed to be stationary, and the left guide arm 15 to be moveable along an appropriate guide way at its upper end so as to adjust the opening between the two guide arms to accommodate the size of the work piece to be sawed. Since the structure of the guide arms and the arrangement for adjusting the span between the guide arms does not form an integral part of the invention it is not further illustrated. In order to provide coolant to the cut, a coolant system is incorporated in the machine, which system includes a supply of coolant to left guide arm 15 which is so arranged at to cause the coolant to exit from left guide arm 15 in close relationship with the blade 17 so that it is carried into the cut during the sawing operation.

As illustrated in the prior art representation of FIG. 1, the current system results in the coolant 18 emerging from left guide arm 15 in the same location as blade 17 emerges therefrom, and, while carried downstream to a slight extent, falling generally vertically downwardly to the work piece as indicated at 19. It will be understood that the blade 17 is shown out of engagement with the work piece for purposes of illustration, but that, even when the blade is engaged with the work piece, the coolant 18 will be primarily concentrated at the upstream, or, in this instance, the left side of the cut in the work piece.

In the system of this invention, the coolant 20 is carried downstream almost, in the specific instance illustrated, the entire working span between the jaws 13 and 12 of the machine vise 11 so that contact with the full length of the cut in the work piece is assured during the cutting operation. Note that in the specific example illustrated, coolant holds the blade as far as area 21. It should be appreciated of course that the illustration is obviously a view of the operation of the system at a moment in time; the very next moment a thin sheet of coolant may drip downwardly from the saw blade over its entire length. The point is however that with the system of this invention the coolant is carried downstream with the blade so as to be available at substantially all locations along the length of the cut in the work piece.

Left guide arm 15 is illustrated in detail in FIGS. 3 and 4.

In FIG. 3, guide arm 15 is shown in relation to blade 17; the blade moves to the right, which will be the downstream direction for purposes of illustration. The guide arm consists of a structural member 23, the lower end of which terminates in machined surfaces indicated at 24 and 25. A blade guide assembly is indicated generally at 26, the blade guide assembly consisting of housing 27, details of which are not important to an understanding of the invention, which housing is secured to the lower end of the guide arm 15 by means of bolts 28, 29 and 30. The housing assembly includes a pair of blade guides, preferably made of carbide and indicated at 31, 32. As can be clearly seen in FIG. 4, the carbide blade guides are arranged to provide zero clearance with the blade 17 so as to provide maximum vertical support for the blade as it passes through the span between guide arms 15 and 16, and receives the feed force which moves the blade downwardly through the work piece.

The coolant system includes a source of coolant, represented schematically by the inlet 33, the inlet communicating with a vertical coolant passageway 34 which terminates, at its lower end, at a pressure plate assembly 35. The pressure plate assembly consists essentially of a generally trapezoidal shaped block having parallel sides which are secured to the lower end of left guide arm by screw 37. The block carries a slide insert 38 which, as best seen in FIG. 4, forms an abutment surface for the upper edge of blade 17. As best seen in FIG. 3, the right side of the trapezoidal block slopes downwardly and in a downstream direction as viewed in FIG. 3.

The coolant system further includes a horizontal passage 39 which terminates, in a horizontal direction, at orifice plate 40. The coolant passageway has a second generally vertically aligned portion 41 the lower end of which is closed off by the slanting surface 48 of the trapezoidal block 36.

The orifice plate 40 is generally rectangular in outline as best seen in FIG. 5 and is secured to the right or downstream surface 25 of the guide arm 15 by screws 42 which are received in threaded bores 43 of the guide arm. An elongated opening, indicated generally at 44, is formed in the orifice, the opening being of a configuration which permits free passage of the blade 17. As will be appreciated from FIG. 5, the opening has a configuration in which the vertical height is a multiple of the width between the two generally parallel sides. In FIG. 6 it will be noted that the exit opening 45 formed by a pair of knife edges, the knife edges in turn forming an exit passage 46 which is formed by the inwardly tapered surface indicated generally at 47. It will be noted that in this instance the angle of taper of the surface 47 with respect to the horizontal is approximately 45 degrees, and this angle has been found to perform efficiently.

The use and operation of the invention is as follows.

With the band saw in a run condition, coolant is admitted from the source 33 into the coolant passageway 34 from whence it flows, under pressure generally, down passageway 34 and into horizontal passageway 39. The coolant continues downwardly and impinges against the upper side of diverter block of pressure plate 36, and thence moves to the right or in a downstream direction.

The coolant which impinges against the tapered surface 48 will have imparted to it a force having a component which is parallel to the direction of movement of blade 17 and, as a result, the coolant will exit from the exit opening 45 in orifice plate 40 moving in a nearly horizontal, downstream direction. Since the blade will be moving at a substantial rate of speed, of which a range of 55 to 400 feet per minute is typical, the end result will be that the coolant fluid is "pulled" or at least urged by the surface tension and the kinetic forces to move downstream to the right a substantial distance, as illustrated in FIG. 2.

The result will be that coolant will be physically present over all, or substantially all, the length of the cut in work piece 14, even when the largest diameter, (at the mid-section), is reached. As a result, the possibility of chips welding to the individual teeth of the blade, and then causing said teeth to be broken off on the next or succeeding pass through the work piece, is substantially eliminated because the high temperatures required for welding the chip to the teeth will not be generated. Similarly, heavier feeds might be employed than would otherwise be the case because the blade runs cooler due to the presence of the coolant throughout all or substantially the entire length of the cut. And finally, the presence of coolant throughout all, or substantially the entire length of, the cut results in more efficient power usage for a given feed, blade speed and blade because of the greater lubricity between the blade and the work piece.

Although a preferred form of the invention has been illustrated and described, it will be understood that the invention may take forms not specifically illustrated in the drawing. Accordingly, it is intended that the scope of the invention be limited not by the foregoing specific embodiment, but solely by the scope of the hereinafter appended claims when interpreted in light of the prior art.

What is claimed is:

1. In a coolant system for a metal cutting band saw having a guide arm located on the upstream side of the cutting span and in close proximity to the work piece being cut, said guide arm having within it a coolant passageway, the improvement comprising
   a structure forming an egress opening at the end of the
   an orifice means having an opening therein having sides to either side of the band saw blade, said sides being substantially parallel to each other,
   said sides having a lower portion substantially conforming to said band saw blade, and having an upper portion extending substantially upwardly from the plane containing the band saw blade back surface so as to define a space through which the band saw blade does not pass, and
   deflector means upstream from and near to said egress opening,
   said deflector means having a surface element angularly displaced from both the horizontal and the vertical aligned with a perpendicular coolant flow passageway section,
   said coolant flow passageway section directing coolant in a direction perpendicular to the direction of band saw blade movement,
   said deflector means being disposed in the path of coolant flow so as to intercept a portion of said coolant as it travels in said perpendicular direction and redirect said coolant portion in a direction having a component of movement parallel to the direction of movement of the band saw blade, whereby at least some of said coolant portion will be in contact with said band saw blade over a long cutting span from the egress opening.

2. The coolant system of claim 1 further characterized in that
   the orifice means includes a knife edge exit passageway in which the cross sectional area of the exit passageway decreases in a downstream direction.

3. The cooland system of claim 2 further characterized in that
   the decrease in cross sectional area of the exit passageway is formed by a surface which tapers inwardly in a downstream direction at substantially 45 degrees.

4. The coolant system of claim 3 further characterized in that
   the exit passageway is formed in a separate member which is secured to the downstream side of the guide arm by securement means.

5. In a coolant system for a metal cutting band saw having a guide arm located on the upstream side of the cutting span and in close proximity to the work piece to be cut, and a coolant passageway located within the guide arm, the improvement comprising
   means forming a coolant passageway opening on the downstream side of the guide arm,
   orifice means forming an exit passageway which terminates at the opening, said orifice means having a portion extending upardly from the back of the band saw blade, and
   deflector means located in the coolant passageway upstream from the opening,
   said deflector means being located near to said opening and having a surface element angularly displaced from the vertical and from the horizontal,
   said deflector means being arranged to interrupt a portion of said coolant as it travels generally perpendicularly toward the direction of movement of the band saw and direct said coolant in a direction having a component of movement which is parallel to the direction of movement of the band saw whereby at least a portion of said coolant maintains contact with the band saw over a long cutting span downstream from the opening.

* * * * *